(12) United States Patent
Yu

(10) Patent No.: US 6,877,896 B2
(45) Date of Patent: Apr. 12, 2005

(54) AMBIENT TEMPERATURE CONTROL APPARATUS USED FOR MEASURING DISPLAY PANEL

(75) Inventor: Ming-Feng Yu, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 10/248,199

(22) Filed: Dec. 26, 2002

(65) Prior Publication Data

US 2004/0125853 A1 Jul. 1, 2004

(51) Int. Cl.[7] .............................. G01K 1/20; G09G 3/00; G02F 1/00
(52) U.S. Cl. ...................... 374/141; 374/133; 374/208; 374/5; 349/72; 345/30
(58) Field of Search ................................. 374/141, 120, 374/142, 159, 5, 132, 133, 208; 349/2, 72, 58; 345/30, 32; 250/200

(56) References Cited

U.S. PATENT DOCUMENTS

| | | | | |
|---|---|---|---|---|
| 4,119,842 A | * | 10/1978 | Hayden et al. | 250/201.1 |
| 5,089,810 A | * | 2/1992 | Shapiro et al. | 345/88 |
| 5,990,995 A | * | 11/1999 | Ebihara et al. | 349/113 |
| 6,111,424 A | * | 8/2000 | Bosacchi | 324/770 |
| 6,259,565 B1 | * | 7/2001 | Kawamura et al. | 359/630 |
| 6,414,664 B1 | * | 7/2002 | Conover et al. | 345/89 |
| 6,483,562 B1 | * | 11/2002 | Fukuyoshi et al. | 349/113 |
| 6,657,607 B1 | * | 12/2003 | Evanicky et al. | 345/88 |
| 6,683,672 B2 | * | 1/2004 | Ueda et al. | 349/176 |
| 2003/0133207 A1 | * | 7/2003 | Minami et al | 359/885 |

FOREIGN PATENT DOCUMENTS

| | | | | |
|---|---|---|---|---|
| JP | 404100094 A | * | 4/1992 | 345/904 |
| JP | 2002181734 A | * | 6/2002 | G01N/21/958 |
| JP | 2002268044 | * | 9/2002 | G01R/1/06 |

* cited by examiner

*Primary Examiner*—Gail Verbitsky
(74) *Attorney, Agent, or Firm*—Jiang Chyun IP Office

(57) ABSTRACT

An ambient temperature control apparatus used for measuring ambient temperature. The apparatus has a bottom plate, a panel fitting apparatus, an external mask, and a temperature control device. The panel fitting apparatus is disposed on the bottom plate and is suitable for use to fix a liquid crystal panel. The external mask is detachably mounted on the bottom plate to form a cavity, in which the panel fitting apparatus and the liquid crystal panel are enclosed. The external mask includes at least a window allowing the photometer to measure the liquid crystal panel therefrom. The temperature control device mounted to the external mask is suitable to control the temperature variation of the cavity.

10 Claims, 3 Drawing Sheets

AMBIENT TEMPERATURE CONTROL APPARATUS USED FOR MEASURING DISPLAY PANEL

BACKGROUND OF INVENTION

1. Field of the Invention

The invention relates in general to a temperature control apparatus, and more particular, to an ambient temperature control apparatus used for measuring a liquid crystal display. The ambient temperature control is operative to change the ambient temperature of the liquid crystal panel, so as to prevent it from affecting the ambient temperature of the measurement equipment; therefore, the precision of the measurement equipment is ensured.

2. Related Art of the Invention

Having the features of small volume, light weight, low driving voltage, low power consumption, and portability, the liquid crystal display products have been broadly applied. The application extends from products from daily life to high-end industrial production, including clocks, watches, computers, televisions, communication products, medical instrument, aviation transportation, industrial equipment, and special armaments. The high-quality liquid crystal displays tend to gradually replace the conventional color cathode ray tubes.

The conventional fabrication process of liquid crystal displays includes the following steps. A glass substrate is cleaned (pre-cleaning process). An indium tin oxide (ITO) conductive layer is formed on the glass substrate (pattern process). An alignment film is formed on the conductive layer (alignment and pattern transfer process). A spacer is formed between the two glass substrates. An insulating epoxy resin material is printed around the glass substrates (sealant coating process). The substrates are then adhered to each other (assembly and sealing process), and cut into individual dies. The liquid crystal is injected and the assembled substrates are then sealed by pressure, followed by the processes of corner rounding of the glass substrates, inspection of liquid crystal panel, adhesion of polarizer, and final inspection.

The above inspection process of the liquid crystal panel includes inspection of optical characteristics, such as the inspections of brightness, luminance and response time. As the luminance and response time of liquid crystal displays will vary according to ambient temperature, there is a need to perform the inspection of the ambient temperature dependent luminance and response time.

The conventional measurement apparatus of liquid crystal panels is shown in FIG. 1. Referring to FIG. 1, the measurement apparatus 100 includes at least a reaction chamber 102 and a photometer 104. In this example, a colorimeter is used. The liquid crystal panel 108 is fixed in the reaction chamber 102 via the panel fitting apparatus 106. The photometer 104 is used to measure the liquid crystal panel 108. Further, the measurement apparatus 100 includes a temperature control apparatus (not shown). When the temperature variation is required, the temperature of the reaction chamber 102 is either increased or decreased to perform the measurement.

However, the photometer 104 has a certain operating temperature range, for example, the operating temperature range for the above photometer (calorimeter) is about 23° C.±3° C. When the temperature variation of the liquid crystal panel 108 at either a higher or a lower temperature has to be measured, the temperature variation (increased or decreased) reflects the variation of the whole reaction chamber 102. As a result, the photometer 104 is frequently operated at a temperature out of the operating temperature range. The precision and accuracy of the measurement obtained therefrom is thus unreliable.

SUMMARY OF INVENTION

The present invention provides an ambient temperature control apparatus used for measuring a liquid crystal panel which can change the ambient temperature surrounding the liquid crystal panel, so that the measurement precision of the photometer is ensured.

The ambient temperature control apparatus used for measuring a liquid crystal panel provided by the present invention comprises a bottom plate, a panel fitting apparatus, an external mask, and a temperature control device. The panel fitting apparatus is disposed on the bottom plate and is suitable for fixing a liquid crystal panel. The external mask is detachably mounted to the bottom plate to form a cavity, in which only the panel fitting apparatus and the liquid crystal display are enclosed. The external mask has at least one window allowing the photometer to perform measurement on the liquid crystal panel. The temperature control device is mounted on the external mask to control the temperature variation of the cavity.

In one embodiment of the present invention, the ambient temperature control apparatus used for measuring the liquid crystal panel encloses only the liquid crystal panel therein. Therefore, when the ambient temperature has to be changed for measuring the liquid crystal panel, the ambient temperature of the photometer is not affected. Therefore, an appropriate operating temperature of the photometer can be maintained to ensure the measurement precision thereof.

BRIEF DESCRIPTION OF DRAWINGS

These, as well as other features of the present invention, will become more apparent upon reference to the drawings wherein.

DETAILED DESCRIPTION

Figure 1:
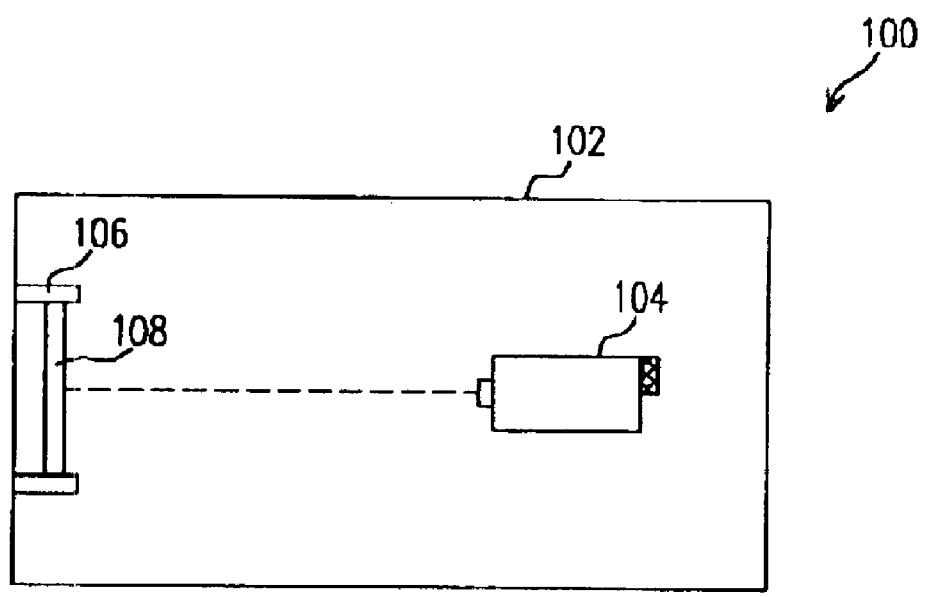
FIG. 1 shows a conventional measurement apparatus used for measuring the optical characteristics of a display panel.
Figure 2:
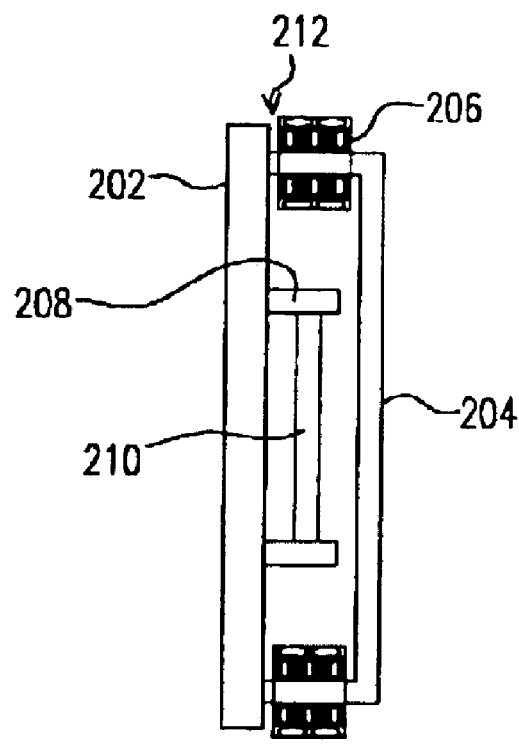
FIG. 2 shows a schematic drawing of an ambient temperature control apparatus used for measuring a liquid crystal panel in one embodiment of the present invention.

FIG. 2 shows a schematic drawing of an ambient temperature control apparatus used for measuring a display panel.

In FIG. 2, the ambient temperature control apparatus used for measuring a display panel includes a bottom plate 202, an external mask 204, a temperature control device 206 and a panel fitting apparatus 208.

The panel fitting apparatus 208 is disposed on the bottom plate 202 for fixing the display panel 210.

The external mask 204 is detachably mounted on the bottom plate 202. When the external mask 204 is mounted on the bottom plate 202, only the display panel 210 and the panel fitting apparatus 208 are enclosed within a cavity 212 formed thereby. The method for mounting the detachable external mask 204 to the bottom plate 202 includes using a pair of snapping type members or latches (not shown) installed on both the external mask 204 and the bottom plate 202, respectively. Therefore, the user can easily attach and detach the external mask 204 from the bottom plate 202 as required.

The temperature control device 206 is mounted on the external mask 204. When the external mask 204 is assembled with the bottom plate 202 to form the cavity 212, the temperature control device 206 allows the temperature of the cavity 212 to increase or decrease.

Figure 3:
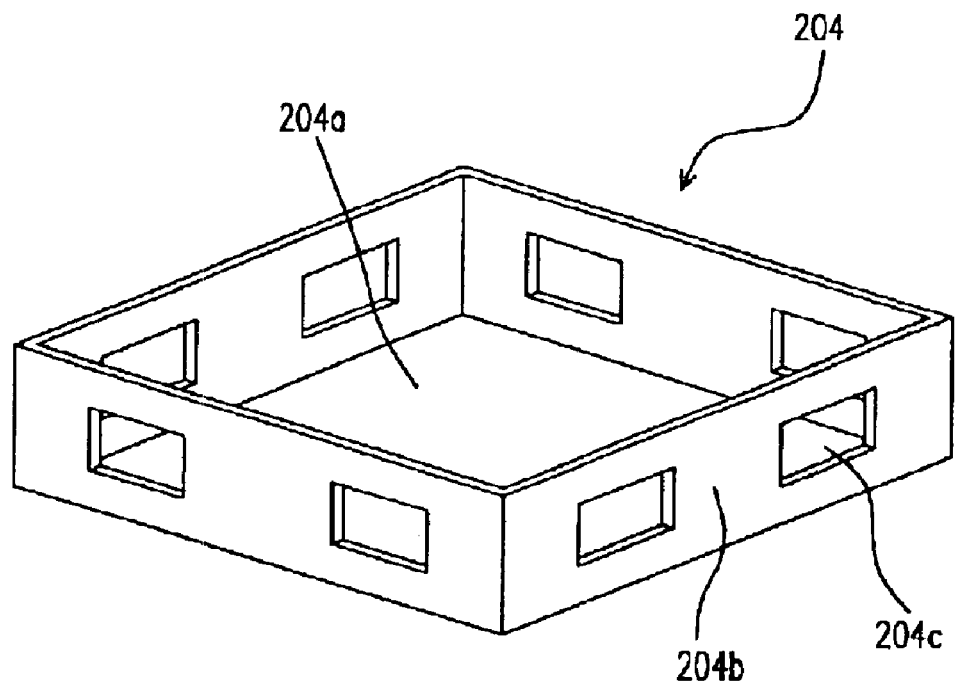
FIG. 3 shows an external mask of an ambient temperature control apparatus used for measuring a liquid crystal panel in one embodiment of the present invention.

FIG. 3 shows a perspective view of the external mask 204 of the ambient temperature control apparatus used for measuring a display panel according to the present invention.

As shown in FIG. 3, the external mask 204 includes a cap 204a and a frame 204b.

To comply with the shape of the liquid crystal panel 210, the cap 204a is often made into a rectangular shape. The cap 204a has at least one window, through which the photometer can measure the optical characteristics of the liquid crystal panel 210. Preferably, the window is made of light transparent material.

The cross section of the frame 204b is identical to the shape of the cap 204a, and one rim of the frame 204b is connected to the perimeter of the cap 204a. The cap 204a and the frame 204b can be formed integrally or separately with the same or different material. In addition, a material with low reflectivity can be coated on an interior wall of the external mask 204 to advantage the measurement. At least one opening 204c is formed on each side surface of the frame 204b for installing the temperature control device 206.

Figure 4:
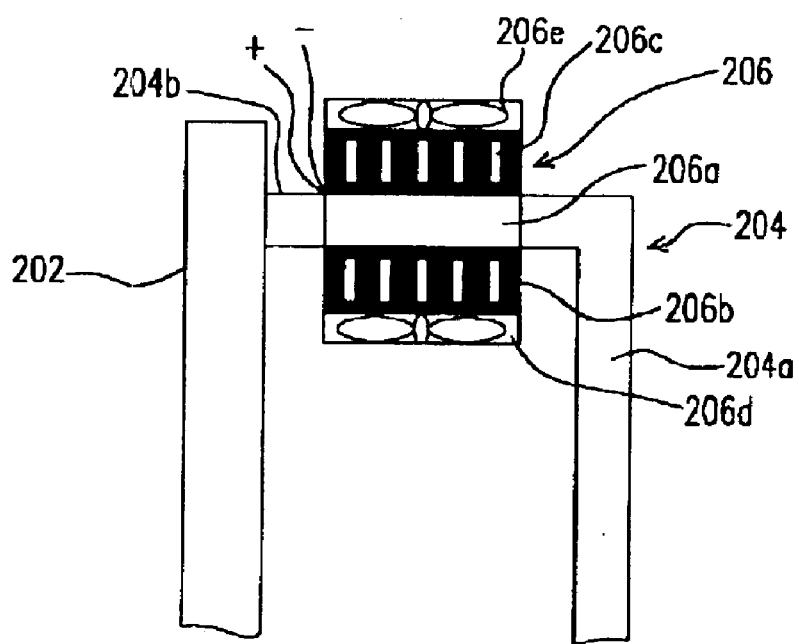
FIG. 4 shows the local enlargement of an ambient temperature control apparatus including a temperature control device used for measuring a liquid crystal panel in one embodiment of the present invention.

FIG. 4 shows the local enlargement of an ambient temperature control apparatus used for measuring the display panel.

In FIG. 4, the device for control temperature variation comprises at least one cooler 206a fitted in the opening 204c of the frame 204b. Heat sinks 206b and 206c are also installed at two sides of the cooler 206a. Further, fans 206d and 206e are further installed over the heat sinks 206b and 206c, respectively.

As the cooler 206a is a semiconductor device generating heat and cooling at two sides via a conducting current, by controlling the direction of the current flow, the direction for heating or cooling the cooler 206a can be changed. For example, when the current flow of the cooler 206a is controlled to direct the heating side towards the interior of the cavity 212, the interior surface of the cavity 212 on the same side as the heat sink 206b and the fan 206d is heated. In contrast, the exterior surface of the cavity 212, that is, the same side as the heat sink 206c and the fan 206e, is the cooling surface. Meanwhile, a heating effect can be obtained inside the cavity 212. On the contrary, if the current flow is reversed to the opposing direction, the interior surface of the cavity 212 becomes a cooling surface, while the exterior surface thereof becomes a heating surface. A cooling effect can thus be obtained inside the cavity 212.

The installation of the heat sink 206b and 206c on the cooler 206a allows the hot air (cold air) generated thereby to be diffused. The fans 206d and 206e further enhance the diffusion of the hot air (cold air). According to specific design, the fan installed at the interior of the cavity 212 is so disposed to allow the air to be diffused inwardly, and the fan installed at the exterior of the cavity is so disposed to allow the air to be diffused outwardly with respect to the cavity 212. Therefore, the heating (cooling) effect can be optimized.

Figure 5:
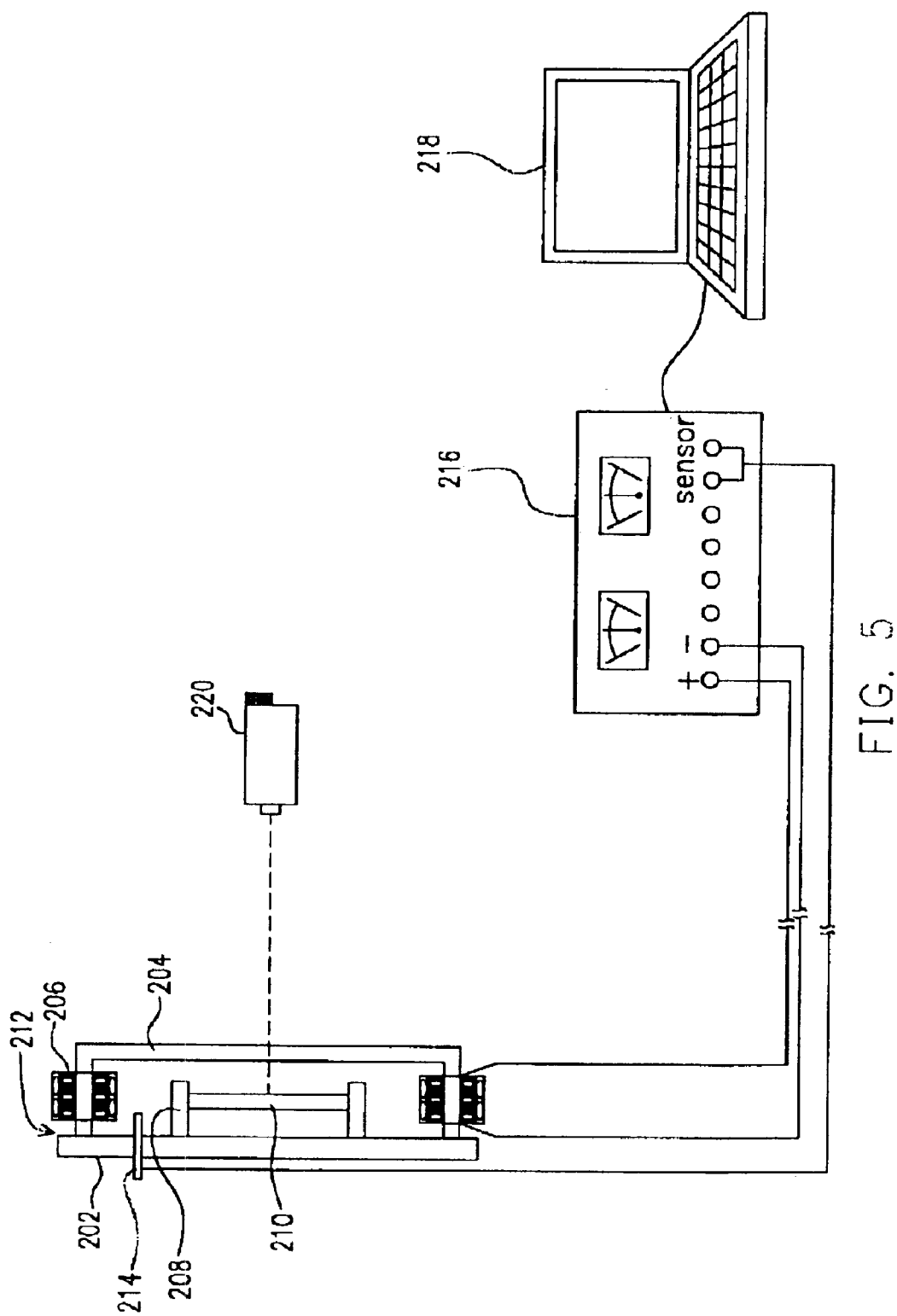
FIG. 5 shows a schematic drawing of an ambient temperature control apparatus used for measuring optical characteristics of a display panel.

FIG. 5 schematically shows an ambient temperature control apparatus used for measuring optical characteristics of a display panel according to the present invention. The ambient temperature control apparatus is described in detail as follows.

The liquid crystal panel 210 mounted to a panel fitting apparatus 208 is disposed on the bottom plate 202. The external mask 204 with the temperature control device 206 is installed on the bottom plate 202 to form a cavity 212 enclosing the liquid crystal panel 210 and the panel fitting apparatus 208 therein. A thermal sensor 214 is installed to measure the temperature variation inside the cavity 212.

While performing measurement of the display panel using the ambient temperature control apparatus as mentioned above, a required operating temperature can be input via a computer 218 as shown in FIG. 5. A current supply 216 connected to the computer 218 is used to provide an appropriate current to the temperature control device 206 and the thermal sensor 214 to control the temperature of the cavity 212 to meet the input required temperature. After controlling the temperature of the cavity 212 as required, the optical characteristics of the liquid crystal panel 210 are measured using a photometer 220, for example, a BM-5A colorimeter. As the temperature of the photometer 220 is not affected by the ambient temperature of the liquid crystal panel 210, a precise measurement can be obtained.

In the above measurement apparatus, the light source required for measurement is typically provided by a liquid crystal panel 210, which includes a backlight module. However, in the present invention, a backlight module (not shown) can also be installed on the bottom plate 202 or the panel fitting apparatus 208, such that the liquid crystal panel without the backlight module installed can also be measured. Further, the application range for the temperature control apparatus; and consequently the photometer, is broadened. On the other hand, a stable light source is provided to reduce the error since using the backlight module installed in each liquid crystal panel increases the measurement error. Using the same light source effectively eliminates such measurement error.

Accordingly, since only the display panel is enclosed in the cavity of the ambient temperature control apparatus, the temperature control and variation of the liquid crystal panel will not affect the ambient temperature of the photometer. The temperature of the photometer can thus be maintained within an appropriate operating temperature, and the measurement precision of the photometer is ensured.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. An ambient temperature control apparatus used for measuring optical characteristics of a display panel for use with a photometer, comprising:
   a bottom plate;
   a panel filling apparatus, disposed on the bottom plate for fixing the display panel;

an external mask, detachably mounted on the bottom plate to form a cavity enclosing only the display panel and the panel fitting apparatus therein, the external mask having at least one window allowing the photometer to measure the optical characteristics of the display panel throughout; and an ambient temperature control device, mounted to the external mask to control temperature variation of said cavity to provide an appropriate operating temperature of the photometer.

2. The ambient temperature control apparatus according to claim 1, wherein the external mask is made of a transparent material.

3. The ambient temperature control apparatus according to claim 1, the external mask further comprises:

a cap, with a shape complying with the shape of the display panel, in which the window is formed; and a frame, with a cross section in the same shape of the cap, one rim of the frame being connected to a perimeter of the cap.

4. The ambient temperature control apparatus according to claim 3, wherein the cap is made of transparent material.

5. The ambient temperature control apparatus according to claim 3, wherein the temperature control device is disposed in the frame.

6. The ambient temperature control apparatus according to claim 1, wherein the temperature control device includes a cooler.

7. The ambient temperature control apparatus according to claim 6, further comprises two heat sinks disposed at two sides of the cooler.

8. The ambient temperature control apparatus according to claim 7, further comprising a fan installed over each of the heat sinks.

9. The ambient temperature control apparatus according to claim 1, further comprising a backlight module disposed on the bottom plate.

10. The ambient temperature control apparatus according to claim 1, further comprising a backlight module disposed on the panel fitting apparatus.

* * * * *